Patented Dec. 29, 1953

2,664,438

UNITED STATES PATENT OFFICE 2,664,438

DIALKYL 3-DODECYLOXYPROPANE-1-PHOSPHONATE

Elbert C. Ladd and Merlin P. Harvey, Passaic, N. J., assignors to United States Rubber Company, New York, N. Y., a corporation of New Jersey No Drawing. Application November 3, 1950, Serial No. 194,022

2 Claims. (Cl. 260—461)

This invention relates to the preparation of certain dialkyl propane phosphonates by the free-radical-catalyzed reaction of a dialkyl phosphite and allyl dodecyl ether. The alkyl groups of the phosphite may each contain from 1 to 4 carbon atoms.

This application is a continuation-in-part of application Serial No. 38,188, filed July 12, 1948, now abandoned.

The following example is illustrative of the manner of preparation.

Example 45.28 parts of allyl dodecyl ether are heated with 56 parts of diethyl phosphite at 80–85° C. for 38 hours during which time 1.2 parts of benzoyl peroxide are added in 4 equal increments at 0, 5.5, 14 and 23 hours of elapsed reaction time. The reaction mixture is fractionally distilled under reduced pressure, 41.9 parts of unreacted diethyl phosphite and 23.9 parts of allyl dodecyl ether being recovered, then 30.2 parts of high-boiling liquid residue (b. 192°/0.9 mm.) consisting of diethyl 3-dodecycloxypropane-1-phosphonate.

Analysis.—Calculated: C, 62.60; H, 11.34; P, 8.50. Found: C, 63.02; H, 11.29; P, 7.59.

The chemicals may be used as plasticizers for polyvinyl chloride.

The products have in the molecule thereof the components of one molecule of the phosphite and one molecule of the ether.

The temperature and time of the reaction may vary widely depending on the source of free radicals which may be ultra-violet light or a catalyst of the class of peroxidic compounds (e. g., benzoyl peroxide, tert.-butyl hydroperoxide, acetyl peroxide, hydrogen peroxide, potassium peroxysulfate), hydrazine and substituted hydrazines, azobenzene, and metal alkyls (e. g., sodium ethyl and lead tetraethyl), the amount of such catalyst compound employed being usually in the range of from 0.1 to 15.0% by weight of the reactant mixture.

The reaction temperatures are preferably 60° C. to 100° C. (when using benzoyl peroxide), and the time preferably 2 to 48 hours.

Having thus described our invention, what we claim and desire to protect by Letters Patent is:

1. A dialkyl 3-dodecyloxypropane-1-phosphonate.

2. Diethyl 3 - dodecyloxypropane-1-phosphonate.

ELBERT C. LADD.
MERLIN P. HARVEY.

References Cited in the file of this patent

UNITED STATES PATENTS

| Number | Name | Date |
|---|---|---|
| 2,440,800 | Hanford II | May 4, 1948 |
| 2,478,390 | Hanford et al. | Aug. 9, 1949 |
| 2,492,994 | Harman et al. | Jan. 3, 1950 |
| 2,500,022 | Brown | Mar. 7, 1950 |
| 2,535,172 | Tawney | Dec. 26, 1950 |